US008342319B2

(12) United States Patent
Lutz

(10) Patent No.: US 8,342,319 B2
(45) Date of Patent: Jan. 1, 2013

(54) RECIPROCATING SLAT CONVEYOR

(76) Inventor: David W. Lutz, Carlisle, PA (US)

(*) Notice: Subject to any disclaimer, the term of this patent is extended or adjusted under 35 U.S.C. 154(b) by 312 days.

(21) Appl. No.: 12/793,744

(22) Filed: Jun. 4, 2010

(65) Prior Publication Data
US 2010/0307891 A1 Dec. 9, 2010

Related U.S. Application Data

(60) Provisional application No. 61/184,348, filed on Jun. 5, 2009.

(51) Int. Cl.
B65G 25/00 (2006.01)
(52) U.S. Cl. ............... 198/750.5; 198/750.4; 414/525.9
(58) Field of Classification Search .... 198/750.2–750.7; 414/525.9
See application file for complete search history.

(56) References Cited

U.S. PATENT DOCUMENTS

| 4,735,305 A * | 4/1988 | Lutz et al. ............. 198/774.2 |
| 4,823,938 A * | 4/1989 | Foster .................... 198/750.4 |
| 5,092,732 A * | 3/1992 | Foster .................... 414/525.1 |
| 5,125,502 A * | 6/1992 | Foster .................... 198/750.3 |
| 5,222,590 A * | 6/1993 | Quaeck ................ 198/550.01 |
| 5,390,781 A | 2/1995 | Foster |
| 5,402,878 A | 4/1995 | Lutz |
| 5,522,494 A * | 6/1996 | Lutz ..................... 198/750.3 |
| 5,806,660 A | 9/1998 | Foster |
| 5,934,445 A | 8/1999 | Foster et al. |
| 6,006,896 A * | 12/1999 | Foster .................. 198/750.5 |
| 6,513,648 B1 * | 2/2003 | Hallstrom et al. ...... 198/750.4 |
| 2008/0277246 A1 * | 11/2008 | Berthelsen ............ 198/750.5 |
| 2009/0000918 A1 | 1/2009 | Delamarter et al. |

* cited by examiner

Primary Examiner — Mark A Deuble
(74) Attorney, Agent, or Firm — The Webb Law Firm

(57) ABSTRACT

An improved front-drive reciprocating slat conveyor has a plurality of sets of longitudinally extending slats spaced across the width of a receptacle floor. A cross beam is secured to each set of slats. The cross beams are secured to rod extensions that are connected to the piston rods of a hydraulic drive system by non-alignment critical connectors. The cross beams have connecting elements that engage receiving elements on the slats. The connecting elements and receiving elements are held together by pins or similar connectors. A frame extends across the width of the receptacle. Bearing guides guide and align the rod extensions when the cylinder rods are extended or retracted.

20 Claims, 15 Drawing Sheets

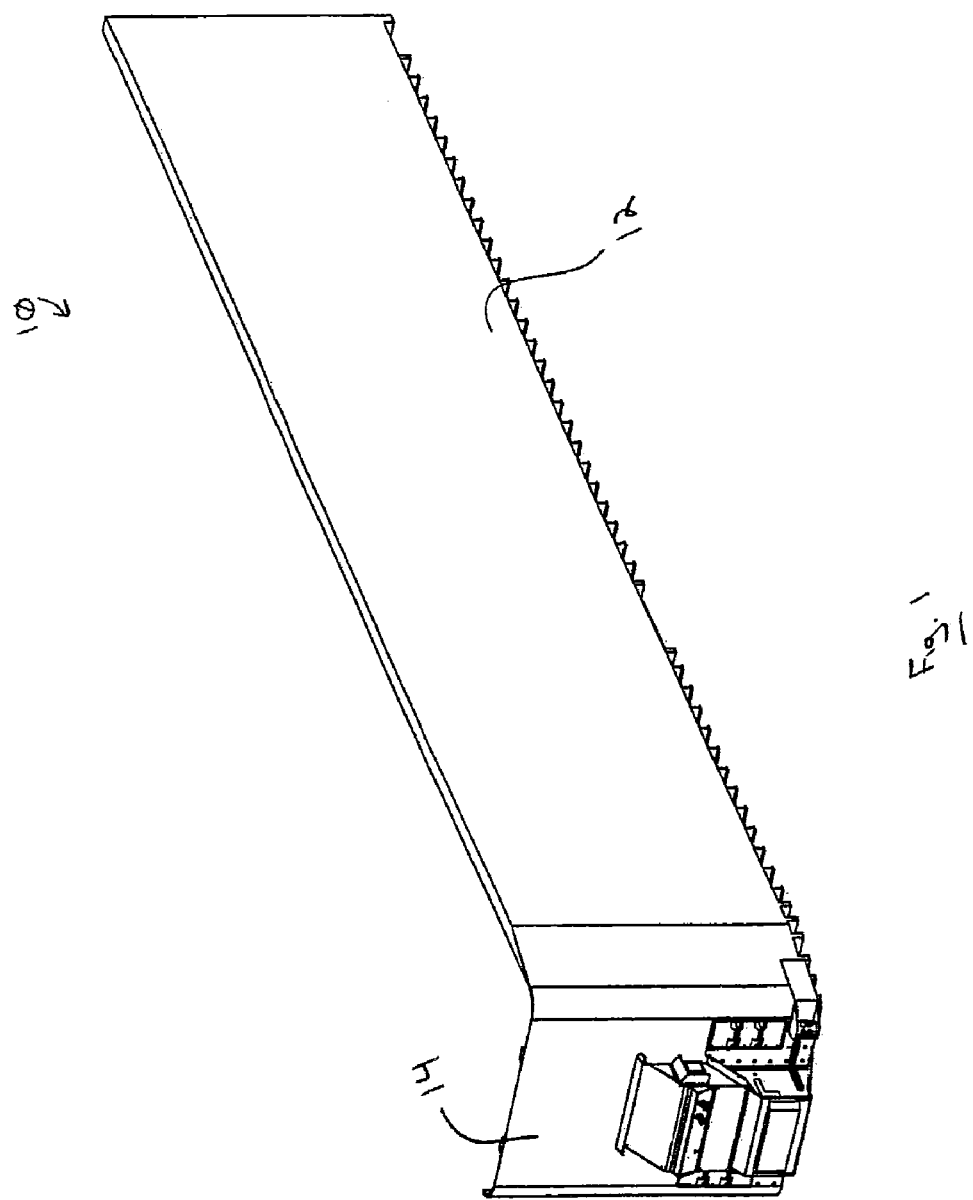

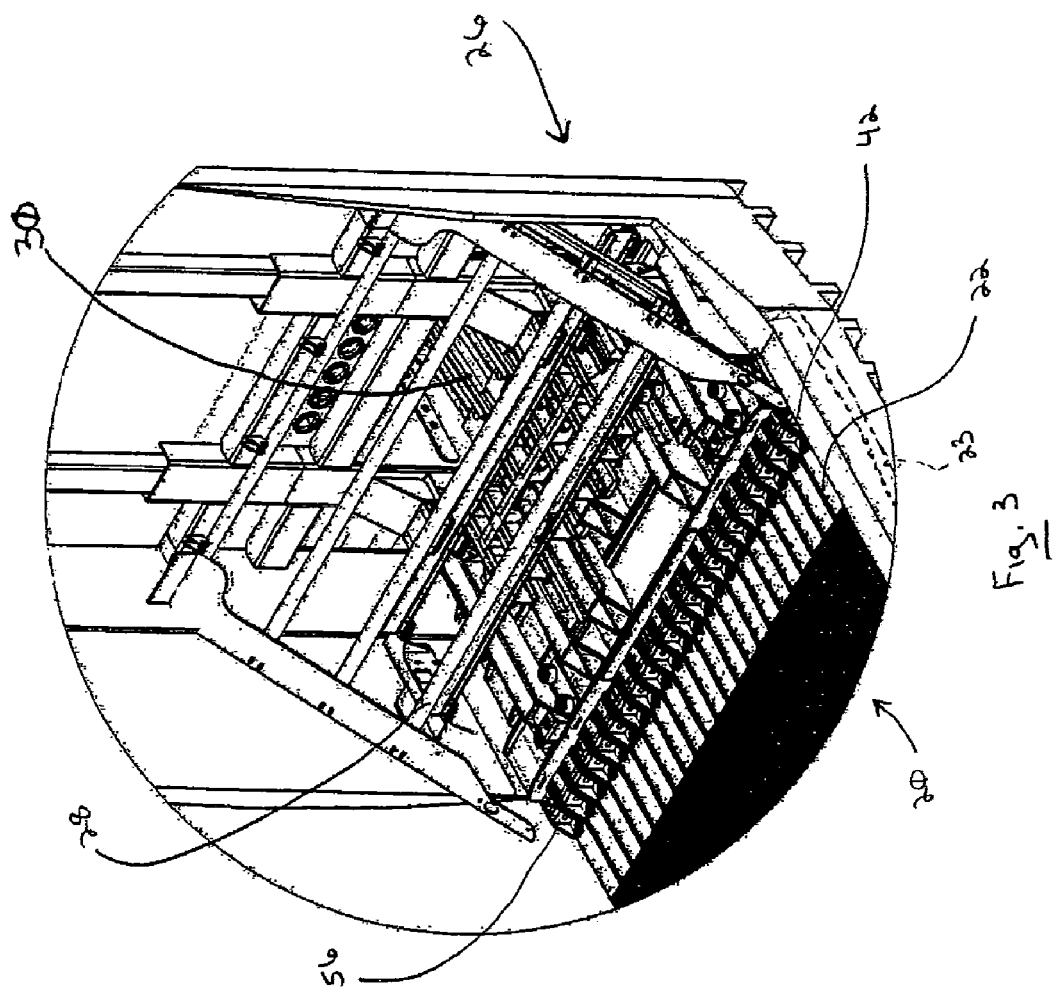

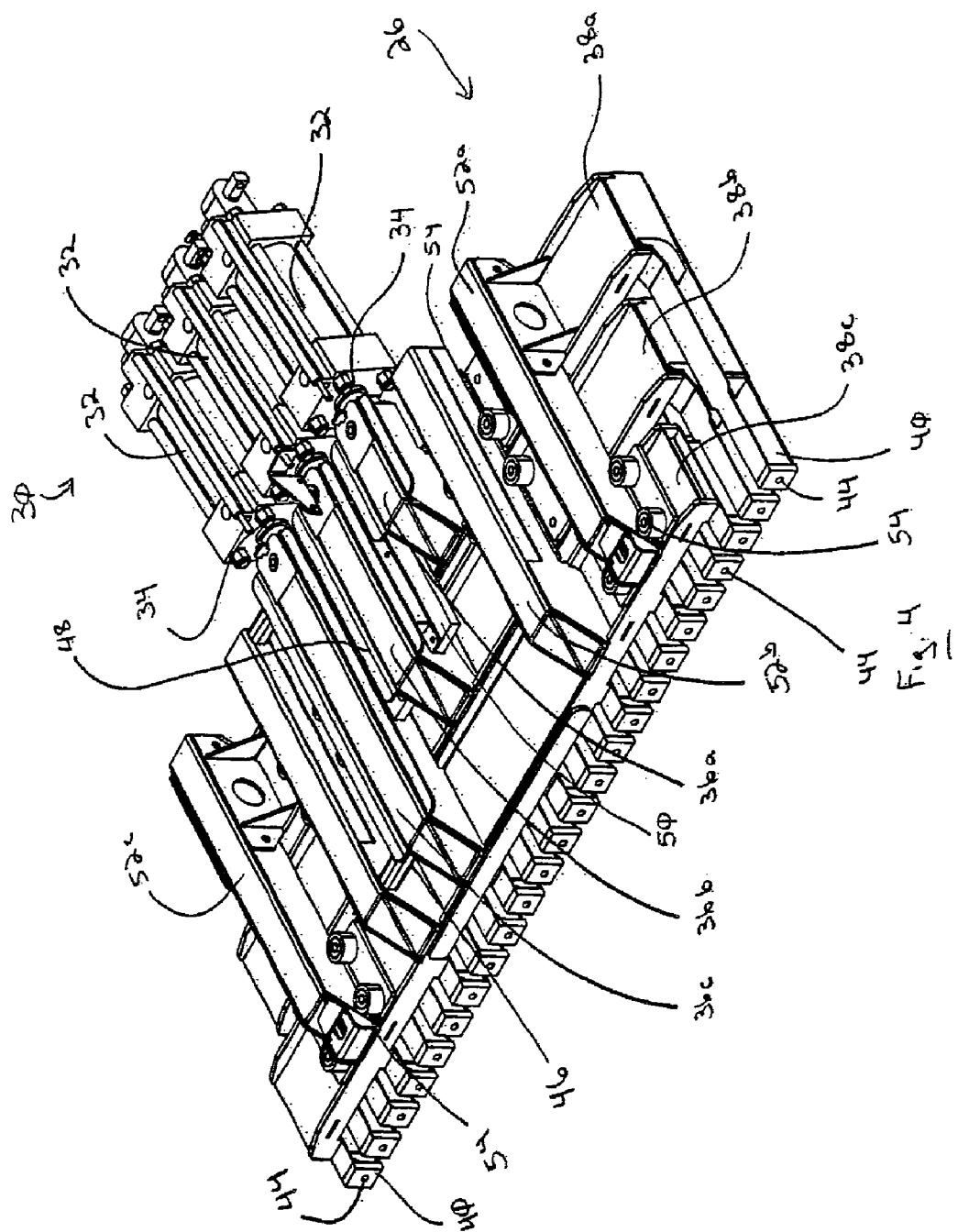

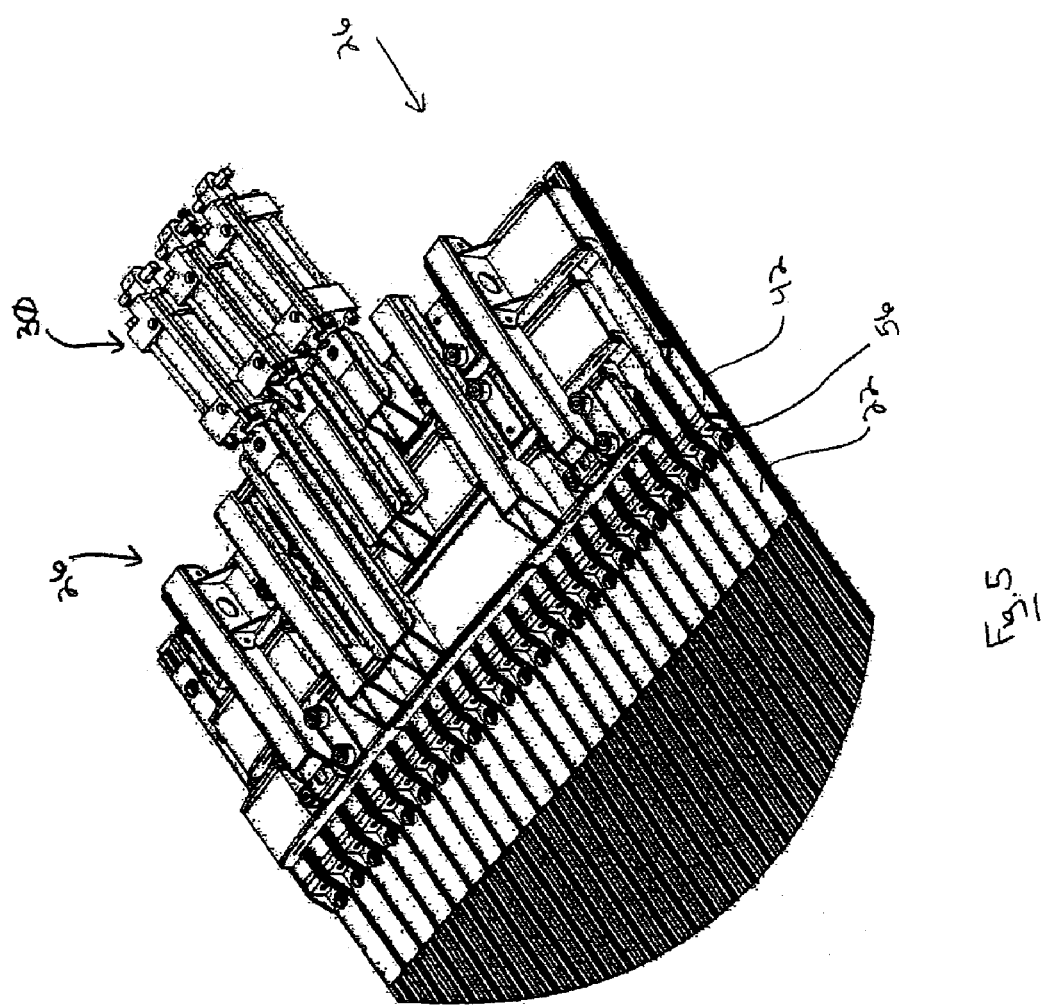

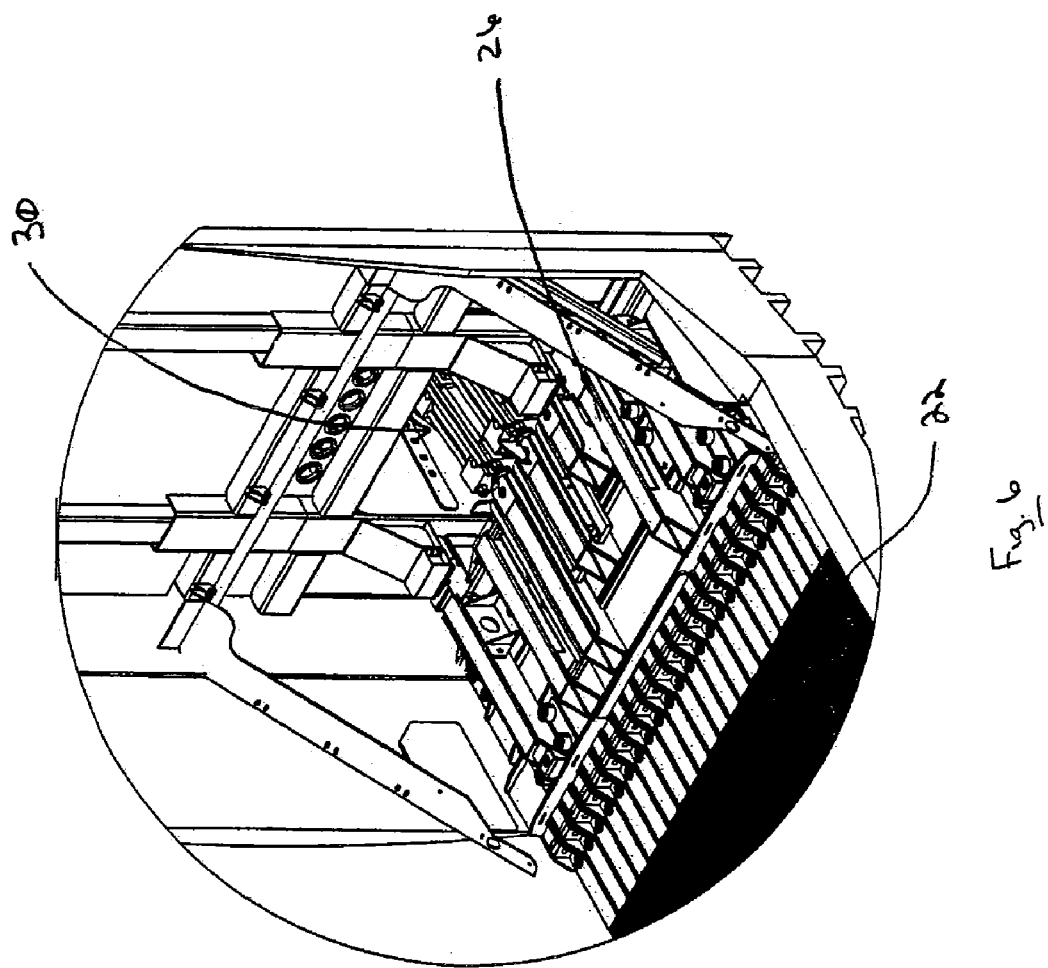

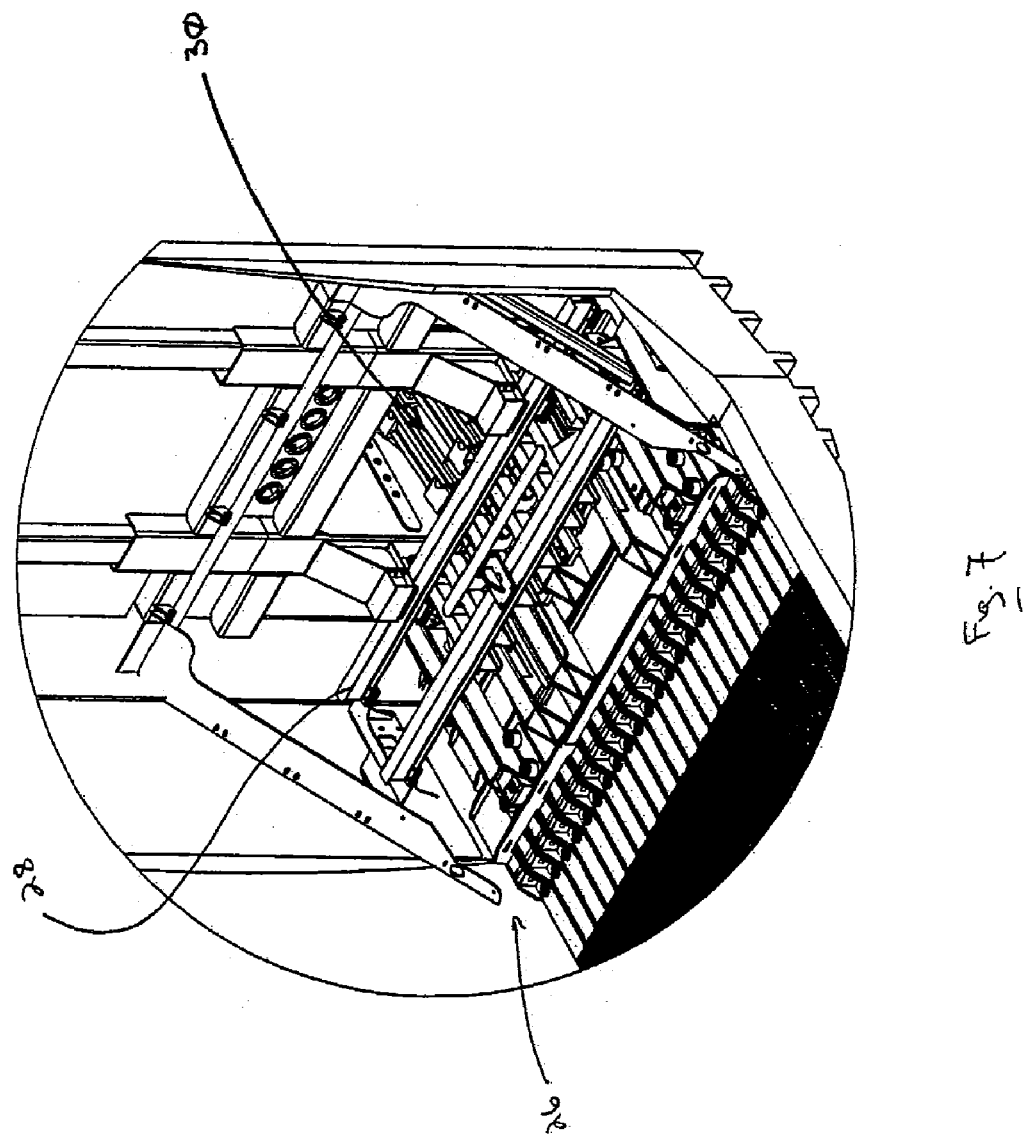

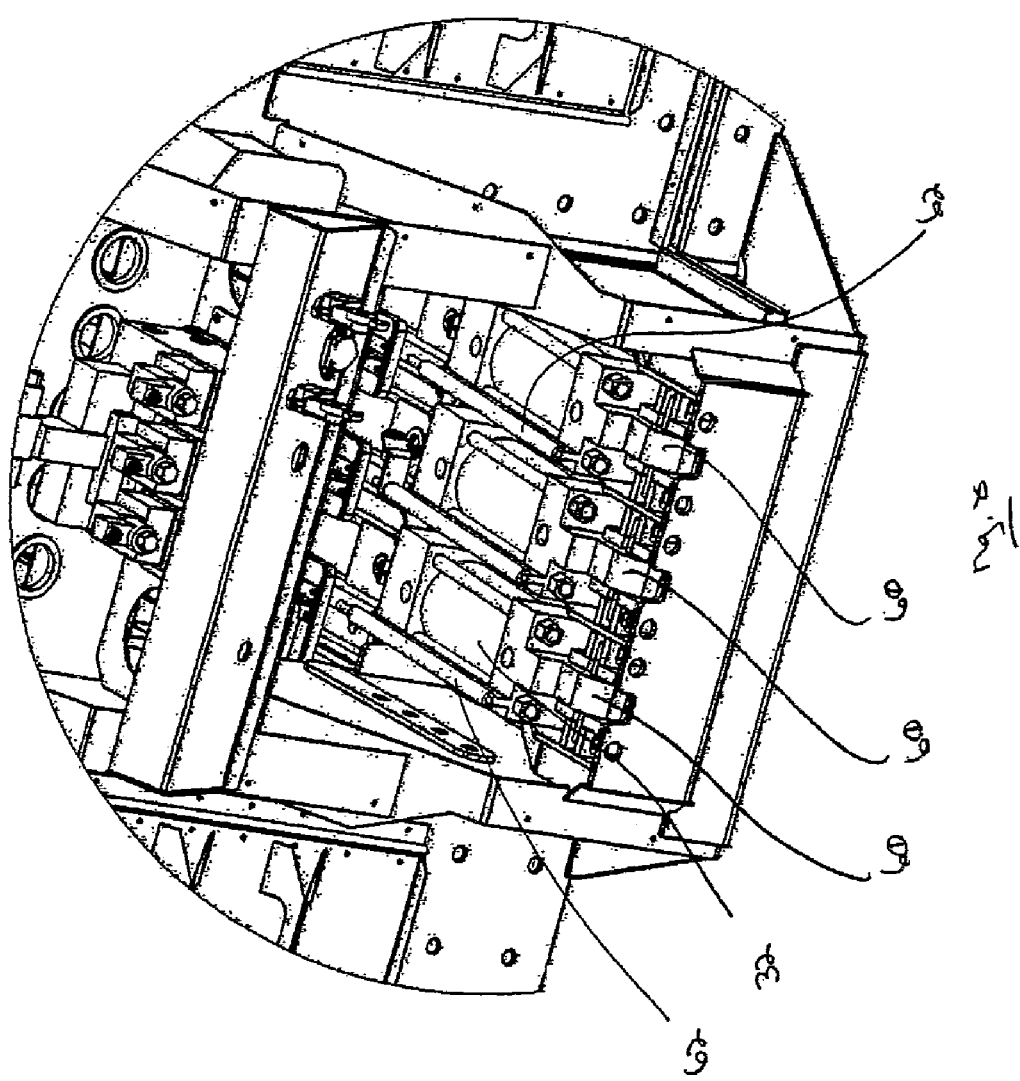

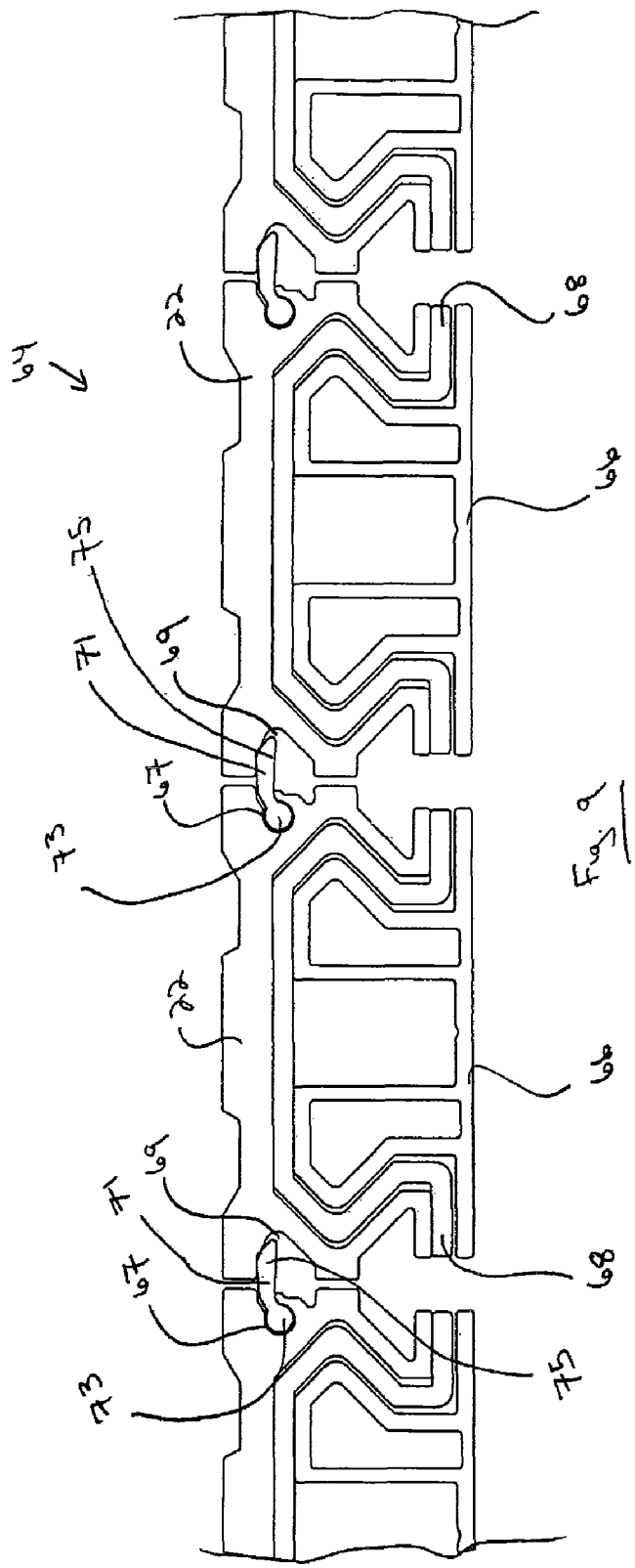

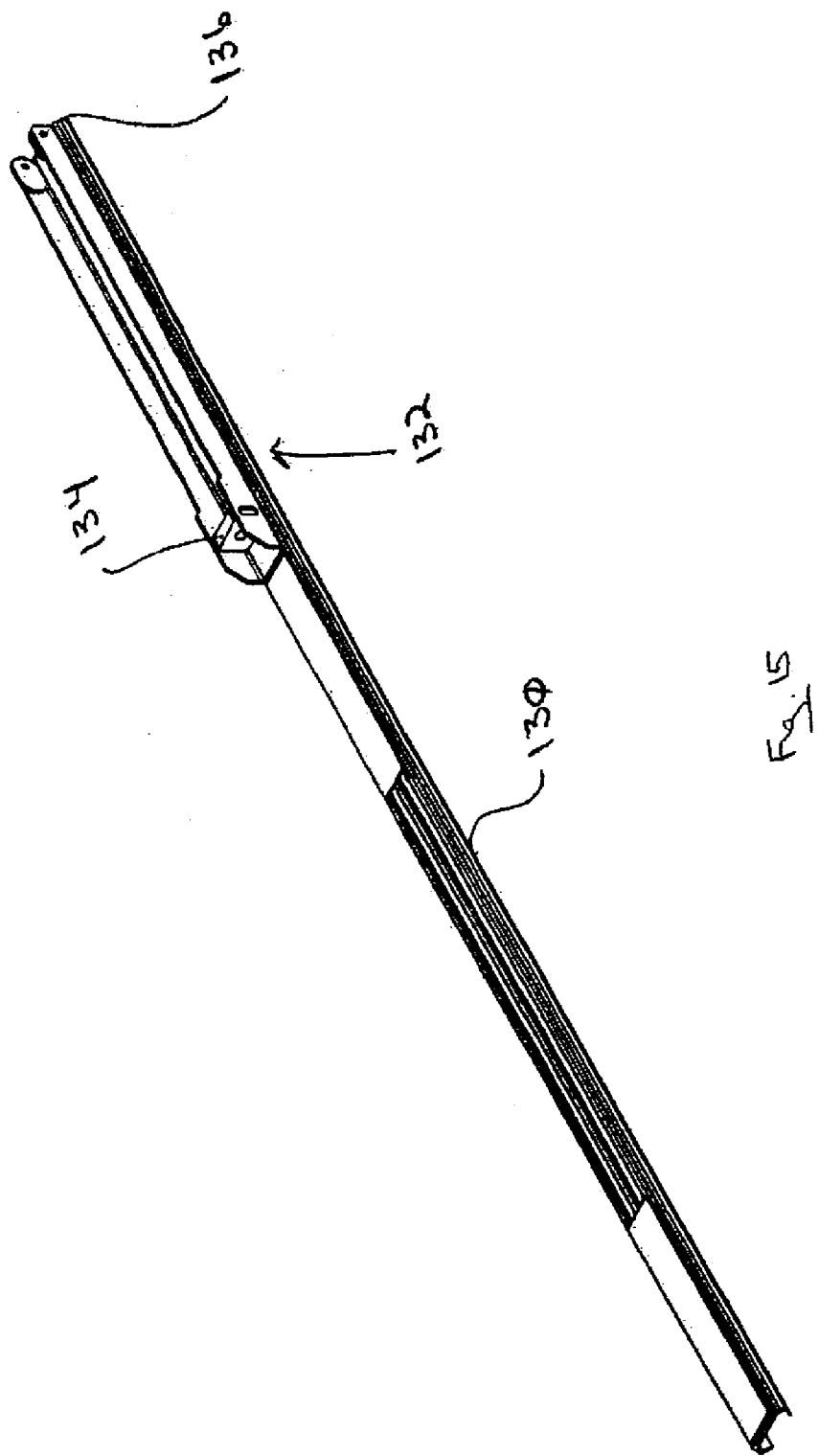

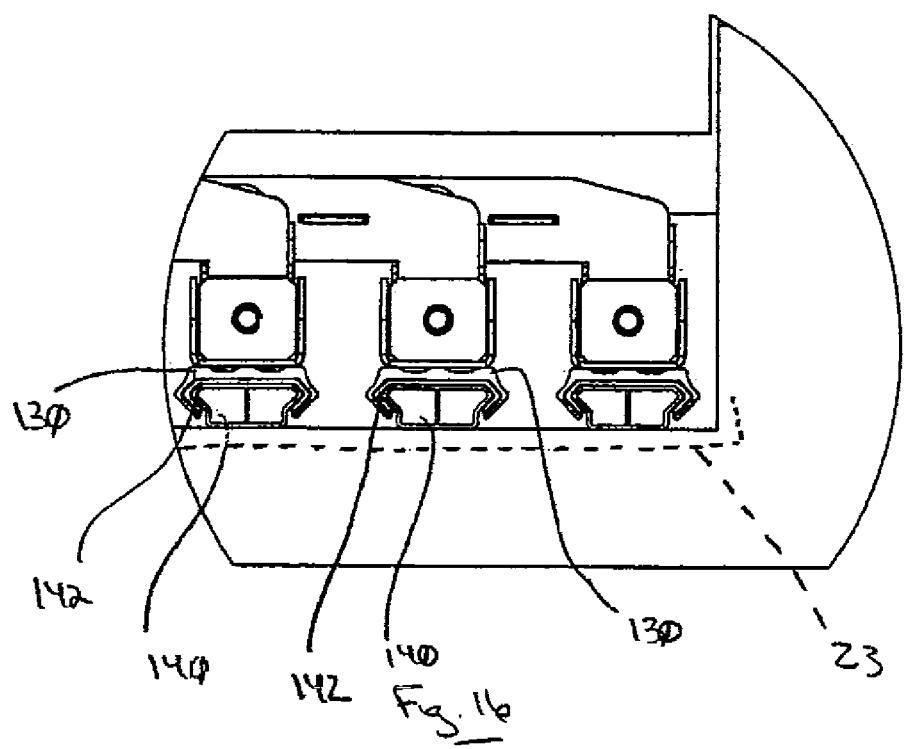

RECIPROCATING SLAT CONVEYOR

CROSS REFERENCE TO RELATED APPLICATION

This application claims priority to U.S. patent application Ser. No. 61/184,348, filed Jun. 5, 2009, which application is herein incorporated by reference in its entirety.

BACKGROUND OF THE INVENTION

1. Field of the Invention

This invention relates generally to reciprocating slat conveyors for loading or unloading cargo from a receptacle and, more particularly, to reciprocating slat conveyors having sets of slats that can be simultaneously or sequentially moved to offload bulk cargo.

2. Technical Considerations

Conventional reciprocating slat conveyors are used for loading and unloading receptacles with bulk cargo, such as garbage, fertilizer, wood chips, sawdust, and the like. The receptacles can be mobile, such as a trailer, or fixed in place. The conveyor floor includes sets of slats having individual slats spaced across the width of the receptacle. The slats are joined to a cross member extending across the width of the floor. A hydraulic drive having hydraulic cylinders is typically positioned in the middle of the conveyor floor or at the front of the trailer to move the slats. The cylinders can be actuated to move all of the slats simultaneously to load or unload the receptacle or to move the sets of slats sequentially to retract the sets of slats back to a starting position.

A problem with conventional mid-drive and front-drive slat conveyors is that the lateral torque absorbed in the cylinder rods can damage the rods or cause the screws connecting the rods to the slats to wear. The rods extend through a front support frame, where torque is transferred to the rod. The rods are rigidly connected to the slats and any torque caused by misalignment of the slats is transferred to the rods. Also, the drive components can become fouled, dirty, or corroded due to material falling through the slats onto the drive components. Moreover, these conventional drive systems do not have non-leak proof capability.

Therefore, it would be advantageous to provide a slat conveyor system that reduces or eliminates at least some of these problems. For example, it would be advantageous to provide a front-drive slat conveyor in which the torque transferred to the rods can be reduced. It would also be advantageous to provide a leak-free slat conveyor system.

SUMMARY OF THE INVENTION

An improved front-drive reciprocating slat conveyor of the invention has a plurality of sets of longitudinally extending slats spaced across the width of a receptacle floor. A cross beam is secured to each set of slats. The cross beams are secured to rod extensions that are connected to the piston rods of the hydraulic drive system cylinders by non-alignment critical connectors. The cylinders are secured to the receptacle by non-alignment critical connections. The cross beams are connected to the slats. A frame interacts with the cross beams to define bearing guides that guide the rod extensions when the cylinder rods are extended or retracted.

The slats move along support beams in the receptacle. Bearing sleeves are provided that have an inner shape complementary to at least a portion of the outer shape of the support beams such that the bearing sleeves can be slid along and held in place on the support beams. The slats have an inner shape that is complementary to at least a portion of the outer shape of the bearing sleeves to help maintain the slats engaged with the bearing sleeves during operation.

A reciprocating slat conveyor comprises a plurality of slats arranged in a plurality of slat sets, with each slat having a receiving element formed on top of the slat; a cross beam assembly connected to the slats, wherein the cross beam assembly includes a plurality of rod extensions, with one cross beam connected to each rod extension, wherein each cross beam includes a plurality of connecting elements configured to engage the receiving elements on the slats; a frame configured to engage the cross beam assembly, the frame defining a plurality of bearing guides configured to guide the rod extensions for lateral movement; and a drive assembly comprising a plurality of cylinders, with each piston rod connected to a rod extension by a non-alignment critical connector.

A deck assembly comprises longitudinal support beams, with each support beam having an exterior profile; plastic bearing sleeves, with each bearing sleeve having an interior profile complementary to at least a portion of the exterior profile of the support beam and slidable along the support beam; and slats having an interior profile complementary to at least a portion of the outer profile of the bearing sleeve and configured to slide along the bearing sleeve.

A deck assembly includes interconnecting adjacent support beam members, wherein the deck assembly also includes a first support beam member having a base and an upwardly extending support element having a groove; and a second support beam member has a base and an upwardly extending support element having a projection, wherein the projection is configured to engage the groove to interconnect the adjacent support beam members.

A deck assembly includes interconnecting adjacent support beam members, wherein the deck assembly also includes a first support beam member having a base and an upwardly extending profiled support; and a second support beam member having a base and an upwardly extending profiled support, wherein the bearing sleeve engages the profiles of adjacent support and the slat engages the bearing sleeve, wherein the slat includes a groove on one side configured to accept an end of an elastomeric bearing element that extends into a receiving groove in an adjacent slat.

BRIEF DESCRIPTION OF THE DRAWINGS

The invention will be described with reference to the following drawing figures wherein the reference numbers refer to like elements throughout.

FIG. 2 is a perspective, broken-away view of a rear end of the trailer of FIG. 1 showing the interior of the trailer;

FIG. 3 is a perspective view of a cross beam assembly of the invention positioned at the front end of the trailer interior and connected to the slats;

FIG. 4 is a perspective view of a cross beam assembly of the invention;

FIG. 5 is a perspective view of the cross beam assembly attached to conveyor slats;

FIG. 6 is a perspective view of the cross beam assembly and slats positioned in the trailer;

FIG. 7 is a perspective view of the front end of the trailer showing the conveyor assembly and frame;

FIG. 8 is a perspective of the hydraulic unit of the conveyor assembly;

FIG. 9 is a cross-sectional view of a portion of a slat conveyor showing the rear end of the conveyor slats;

FIG. 15 is a perspective view of a slat of the invention; and

FIG. 16 is an end view of the slats of the conveyor assembly of FIG. 14.

DESCRIPTION OF THE PREFERRED EMBODIMENTS

Figure 1A:
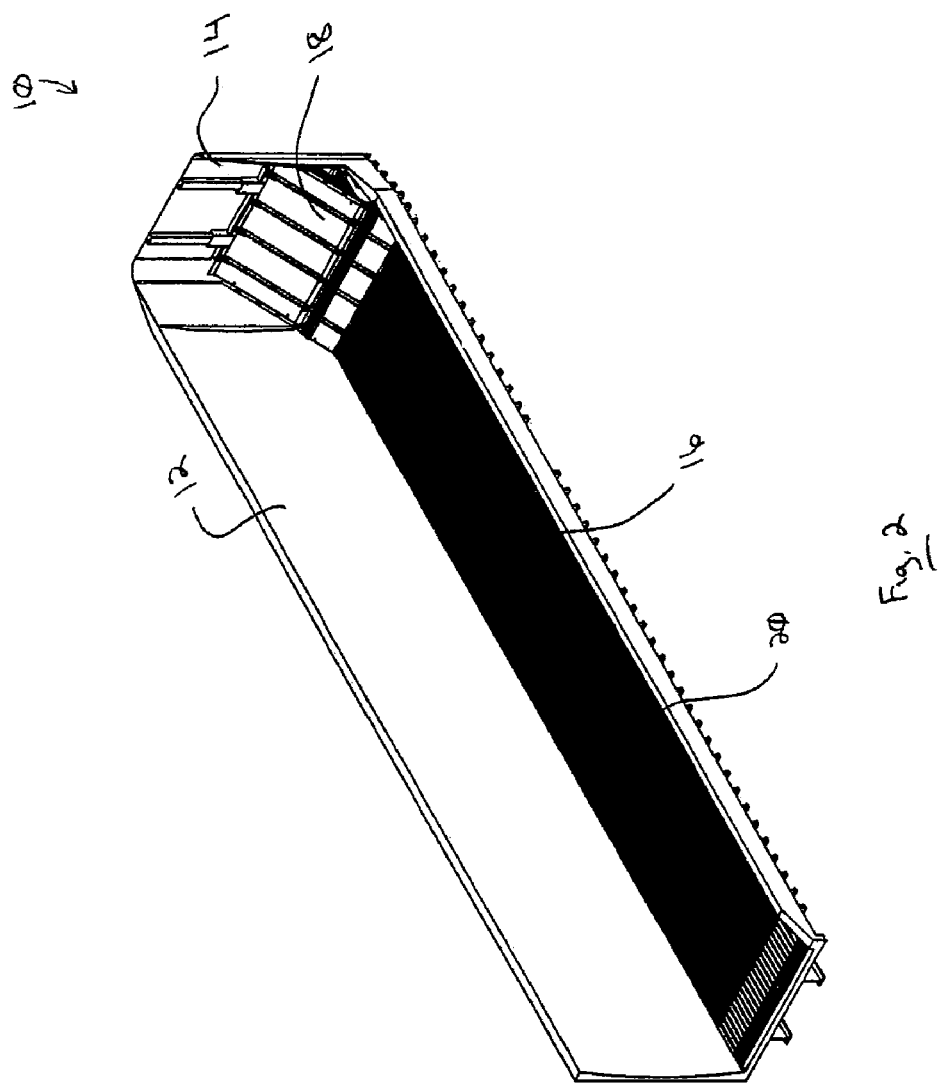
FIG. 1 is a perspective, broken-away view of a front end of a trailer incorporating a reciprocating slat conveyor of the invention.

As used herein, spatial or directional terms, such as "left", "right", "inner", "outer", "above", "below", "top", "bottom", and the like, relate to the invention as it is shown in the drawing figures. However, it is to be understood that the invention can assume various alternative orientations and, accordingly, such terms are not to be considered as limiting. Further, as used herein, all numbers expressing dimensions, physical characteristics, and the like, used in the specification and claims are to be understood as being modified in all instances by the term "about". Accordingly, unless indicated to the contrary, the numerical values set forth in the following specification and claims may vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass the beginning and ending range values and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 3.3, 4.7 to 7.5, 5.5 to 10, and the like. As used herein, the terms "polymer" or "polymeric" include oligomers, homopolymers, copolymers, and terpolymers, e.g., polymers formed from two or more types of monomers or polymers. Additionally, all documents, such as but not limited to issued patents and patent applications, referred to herein are to be considered to be "incorporated by reference" in their entirety.

A cargo receptacle suitable for use with a reciprocating slat conveyor of the invention is shown in FIGS. 1 and 2. In the illustrated embodiment, the receptacle is depicted in the form of a conventional trailer 10 having a load support floor 16. However, it is to be understood that the invention is not limited to trailers but could also be practiced with other types of containers, such as but not limited to ground based containment bins. As will be appreciated by one skilled in the art, slats on the support floor are movable back and forth longitudinally within the trailer 10 by a drive assembly having extensible and retractable piston rods. The slat conveyor also includes a cross beam assembly and a rigid frame.

The front of the trailer 10 houses the drive system, as will be described below. The trailer 10 shown in FIG. 2 is a substantially rectangular trailer having a body with a left sidewall 12, a front wall 14 at a front end of the trailer 10, a support floor 16, and a rear discharge end. The right sidewall and top of the trailer 10 are not shown for ease of description of the invention. The front wall 14 includes an opening through which the piston rods of the drive assembly extend and interact with the cross beam assembly of the invention. The interior of the trailer 10 defines a cargo receiving compartment.

A diagonal slope sheet 18 extends across the width of the trailer 10 and downwardly from the front wall 14. The upper end of the slope sheet 18 is secured to the interior of the front wall 14 and the lower end is secured above a cover plate. The sides of the slope sheet 18 are fixed to the side walls of the trailer 10. The slope sheet 18 can include an access door to provide access to the area under the slope sheet for inspection and cleaning.

A support floor 20 comprises a plurality of elongated load support slats 22 spaced side-by-side across the width of the floor 20. A leak-proof seal, such as a pan 23 (see FIG. 3), is positioned under the slats 22 along the length of the conveyor to prevent liquid and debris falling through the bottom of the trailer 10. The drive assembly moves the slats 22 longitudinally back and forth (fore and aft) between the rear discharge end and the front end of the trailer 10. The slats 22 are grouped into a plurality of slat sets. For ease of discussion, the invention will be described with reference to three slat sets. However, it is to be understood that any number of slat sets could be defined. The slat sets can be moved either all together or selectively by the drive assembly.

FIG. 3 shows the front interior of the trailer 10 with the slope sheet 18 removed exposing a cross beam assembly 26 and a frame 28 of the invention. As shown in FIGS. 3 and 4, the cross beam assembly 26 is connected to a drive assembly 30. In the illustrated embodiment, the drive assembly 30 includes three cylinders 32, each having an associated piston 34. The cylinders 32 are positioned such that the pistons 34 extend from the rear end of the cylinder 32 (with respect to the trailer). The cylinders 32 can be hydraulically or pneumatically operated. The front ends of the cylinders 32 include an attachment device to attach the front ends of the cylinder to the trailer 10 or a support.

As shown particularly in FIG. 4, the cross beam assembly 26 includes a plurality of rod extensions 36. Each rod extension 36 is connected to an individual piston rod 34 by a non-alignment critical connector, such as a conventional swivel socket or similar device to permit relative movement between the end of the piston rod 34 and the rod extension 36. For example, the rod extensions 36 can be connected to the piston rods 34 by a U-shaped connector and pin assembly that permits some degree of movement or misalignment between the rod extensions 36 and the piston rods 34 to help offset any damage that could be caused by twisting or torque forces generated during operation of the conveyor. In the illustrated embodiment, the rod extensions 36 are configured as hollow, substantially rectangular metal pieces. The cross beam assembly 26 also includes a plurality of laterally extending cross beams 38. Each cross beam 38 is connected to one of the rod extensions 36. Each of the cross beams 38 includes a plurality of connecting elements 40 depending therefrom. In the embodiment shown in FIG. 4, the connecting elements 40 are shown as elongated metal elements or "feet" depending from the bottom of the cross beams 38. The connecting elements 40 are configured to engage receiving elements 42 on the slats 22 such that each connecting element 40 is connected to a single slat 22. For example, the rear end of each foot can include an attachment element 44, such as a threaded bore, that can be used to connect the foot to one of the slats 22. In this embodiment, the foot is connected to the slat 22 by a single connection point.

The conveyor assembly 26 also includes guides 46 through which the rod extensions 36 slide. The guides 46 can take the form of metal channels in which the rod extensions 36 slide to help ensure linear movement of the rod extensions 36 and to help prevent twisting or non-linear movement of the rod extensions 36 during operation of the conveyor. The top of the guides can form or can include a guidance device, such as a flange 48 or wing, extending horizontally from the top of the guide wall. These flanges 48 can be located above the top of the rod extensions 36 to engage the frame, as will be described below. Friction bearings 50, such as low friction material, such as a polymeric material, can be positioned on the cross beam assembly 26 such that the rod extensions 36 contact the low friction material to reduce the friction as the rod extensions 36 are sliding forward and aft. The friction bearings 50 also contain lateral and torsion forces. In the illustrated embodiment, the cross beam assembly 26 also includes three stabilization members 52 in the form of elongated, rectangular metal members attached to one of the cross beams 38. Guide members, such as bearings, such as roller bearings 54, on top of the cross beams 38 engage the stabilization members 52 as the cross beams 38 are moved fore and aft. The stabilization members 52 and roller bearings 54 also help prevent torquing and misalignment of the cross beams 38 as they are moved fore and aft.

FIG. 5 shows the cross beam assembly 26 with the connecting elements 40 connected to the receiving elements 42 on the top of the slats 22. The receiving elements 42 can take the form of metal brackets or channels connected to the top of each slat 22. Each receiving element 42 also includes an engagement member, such as a vertical piece 56 having a hole that aligns with the bore in the connecting element 40. A connector, such as a screw or bolt, can be passed through the hole in the vertical piece 56 to engage the bore in the connecting element 40 to attach the slat 22 to the connecting element 40. This provides for a one point connection between the connecting element 40 and the slat 22. Also, since the connecting element 40 is attached to the top of an associated slat 22, this means that there is no need to break through the leak-proof seal (such as the pan 23) to engage the slat 22 with the connecting element 40 of the cross beam assembly 26.

FIG. 6 shows the cross beam assembly 26 mounted in the front of the trailer 10. The piston rods 34 of the drive assembly 26 extend through a hole or passage in the front of the trailer 10 and are connected to the rod extensions 36. As can be appreciated from FIGS. 4 and 6, the cylinders 32 are mounted at an angle with respect to the rod extensions 36. For example, the front end of each cylinder 32 can be located in the range of 1 inch to 5 inches, such as 2 inches to 4 inches, such as 3 inches, higher than the rear end of the cylinder 32. Thus, the drive assembly 30, cross beam assembly 26, and slats 22 are all located above the pan 23 so that no part of the conveyor has to extend through the pan 23, which maintains the leak-free characteristics of the conveyor system of the invention. Also, this means that the cylinder 32 and associated rods 34 operate in one plane while the rod extensions 36 operate in a different plane. The slats 22 operate in a plane parallel to the plane of the rod extensions 36.

FIG. 7 shows the frame 28 positioned over the cross beam assembly 26. The frame 28 can be connected to the sides of the trailer 10 and the bottom of the frame 28 can press downwardly on the top of the guide flanges 48 to prevent the rod extensions 36 from moving vertically and/or horizontally out of the guides 46 during operation of the conveyor. A low friction bearing, such as a polymeric friction pad, can be positioned between the bottom of the frame 28 and the top of the cross beam assembly 26 to reduce any friction caused by movement of the rod extensions 36 against the bottom of the frame 28.

As shown in FIG. 8, the front ends of the cylinders 32 of the drive assembly 30 are connected to the trailer 10 or to a support of the trailer 10. The front ends of the cylinders 32 are connected to the support by a non-alignment critical bearing 60. In the illustrated embodiment, this non-alignment critical bearing 60 can be a swivel socket or any other conventional means to allow swiveling or movement of the front end of the cylinder 32 to account for movement or misalignment during operation of the conveyor. As also shown in FIGS. 8 and 4, electronic position sensors 62 are located on or near the cylinders 32 of the drive assembly 30 to detect when the piston rods 34 have reached their maximum or minimum stroke. In the illustrated embodiment, these position sensors 62 are in the form of electronic proximity detectors having a metal piece and a magnetic detector. Unlike prior conveyors that utilize complex hydraulic circuits, the conveyor of the invention utilizes an electrical sequencing assembly incorporating the electronic position sensors 62 rather than hydraulic pop-it valves to detect the cylinder strokes. The sensors 62 are connected to an electronic control device, such as a conventional digital computer, such as a programmable logic controller (plc) device, to control operation of the conveyor. This electronic control greatly simplifies the hydraulic circuit of the invention since conventional throw in/throw out valves can be used rather than the complex valves of prior systems.

FIG. 9 shows a cross-sectional view of a deck assembly 64 of the invention. The deck assembly 64 includes support beams 66 having an exterior profile. In one aspect of the invention, bearing sleeves 68 of a low friction material, such as a plastic material, are connected to the support beams 66 by slipping one end (forward end) of the bearing sleeve 68 onto the end of the support beam 66 and then pushing the bearing sleeve 68 forward so that the inner profile of the bearing sleeve 68 mates with at least a portion of the outer profile of the support beam 66. The bearing sleeves 68 have an inner profile that is complementary to at least a portion of the outer profile of the support beams 66 to keep the bearing sleeves 68 in place. The bearing sleeve 68 can be retained on the support beam 66 by an end cap or similar fastening device at the rear end and the front end of the support beam 66. The front end of the bearing sleeve 68 can abut against the front wall 14 of the trailer 10. Thus, the bearing sleeve 68 can extend along substantially the entire length of the support beam 66. As shown in FIG. 9, the slats 22 have an inner profile that is complementary to at least a portion of the outer profile of the bearing sleeve 68 to help mate the slat 22 to the bearing sleeve 68 (and thus the support beam 66). One side of the slat 22 can have a channel 67 and the other side of the slat 22 can have a groove 69. The slats 22 are positioned such that the channel 67 of one slat faces the groove 69 of the adjacent slat 22. A flexible member 71 has one end 73 configured to engage the channel 67 and another end 75 configured to extend into the groove 69. The flexible member 71 helps reduce or prevent debris from falling through the gap between adjacent slats 22. For example, the bearing sleeves 68 and slats 22 can be installed and then the flexible member 71 slid into the channel 67 and groove 69 at the rear of the conveyor and pushed forward to the front of the conveyor. An end cap can be attached at the rear end of the conveyor to keep the bearing sleeves 68 and flexible members 71 from sliding out of the deck assembly 70.

Figure 10:
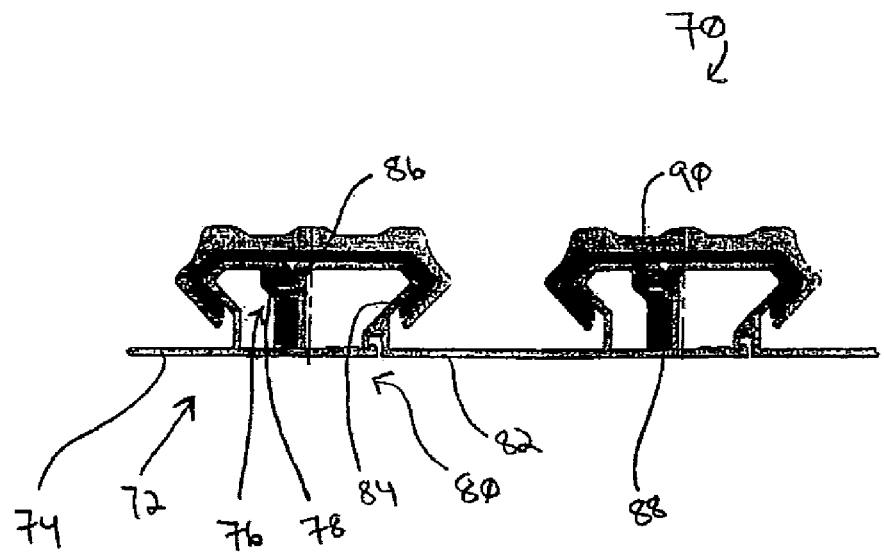
FIG. 10 is an end view of a leak-free slat assembly of the invention.

Another deck assembly 70 is shown in FIG. 10. This deck assembly 70 is particularly useful for leak-free systems to prevent debris from dropping onto the roadway through the bottom of the trailer. In this configuration, a non-porous pan may be installed in the trailer 10 or a leak-free deck can be formed as the deck assembly is formed. The support beams can be formed by adjacent and interconnecting support beam members extending laterally along the floor of the trailer. One support beam member 72 (left side in FIG. 10) has a base 74 and a support element 76 extending upwardly therefrom. The support element 76 has a notch or groove 78 along an inner side. The second support beam member 80 (right side in FIG. 10) also includes a base 82 with an upwardly extending support element 84 having an extension or projection 86 configured to engage the groove 78 on the first support element 76 to connect the adjacent support beam members 72, 80 together. This arrangement reduces the number of bolts or connectors needed to form the deck assembly since adjacent pieces interconnect with each other and do not have to be individually secured to the deck of the trailer. An elastomeric member, such as an elongated polymeric strip 88, can be positioned in a channel 90 formed between the first support element 76 and second support element 84 to seal the support elements. In one embodiment, the adjacent support beam members 72, 80 themselves form a leak-free seal on the trailer floor and the separate pan 23 may not be needed.

Figure 11:
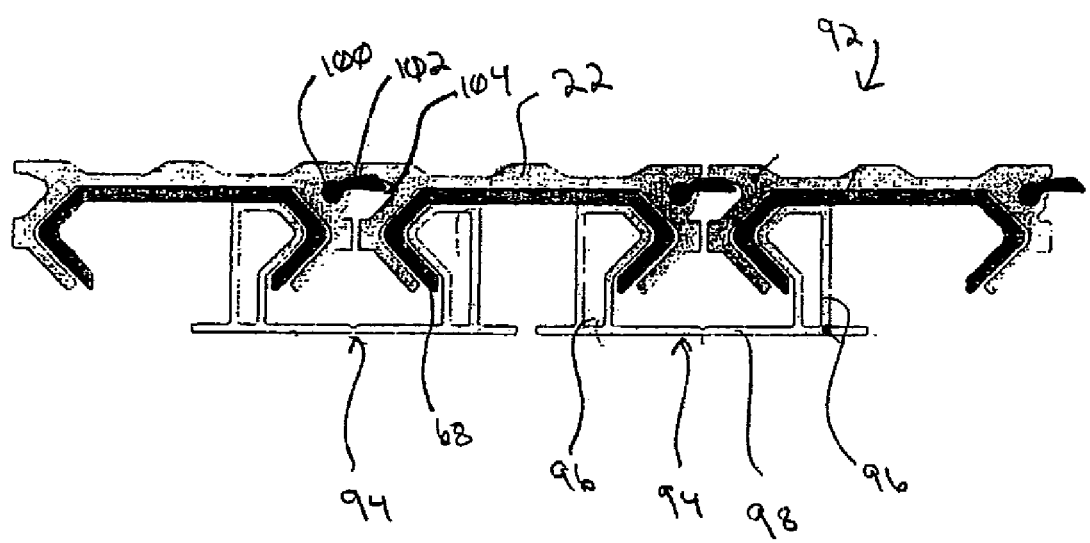
FIG. 11 is an end view of a further leak-free slat assembly of the invention.

FIG. 11 shows another leak resistant deck assembly 92 having adjacent support beam members 94 that can be interlocked and interconnected. Each support beam member 94 has a pair of inwardly facing profiled supports 96 extending upwardly from a base 98. The bearing sleeve 68 is positioned over the profiles of adjacent support beam members 94 and the slat 22 is positioned to engage the bearing sleeve 68. As shown in FIG. 11, each slat 22 can have a groove 100 in one side configured to accept an end of an elastomeric bearing element, such as a plastic strip 102, that extends into a receiving groove 104 on the adjacent slat 22. This provides a leak-resistant sub deck to prevent particles passing through the bottom of the trailer.

Operation of the conveyor assembly will now be described. When all of the piston rods 34 are extended at the same time, the cross beams 38 simultaneously move the three sets of slats 22 toward the rear discharge end to move cargo resting on the slats 22 rearward a distance equal to the length of the discharge stroke. Upon completion of the discharge stroke, the drive assembly 30 sequentially moves or retracts the sets of slats 22 forwardly by moving one slat set (one cross beam 38) at a time toward the front of the trailer 10 so that the slats 22 are repositioned to the front of the trailer 10 without moving the cargo forward. The withdrawal stroke distance is equal to the discharge stroke distance. The drive assembly 30 is reversible so that the slat conveyor can move a load from the discharge end of the trailer 10 to the front wall of the trailer 10 for loading.

Figure 12:
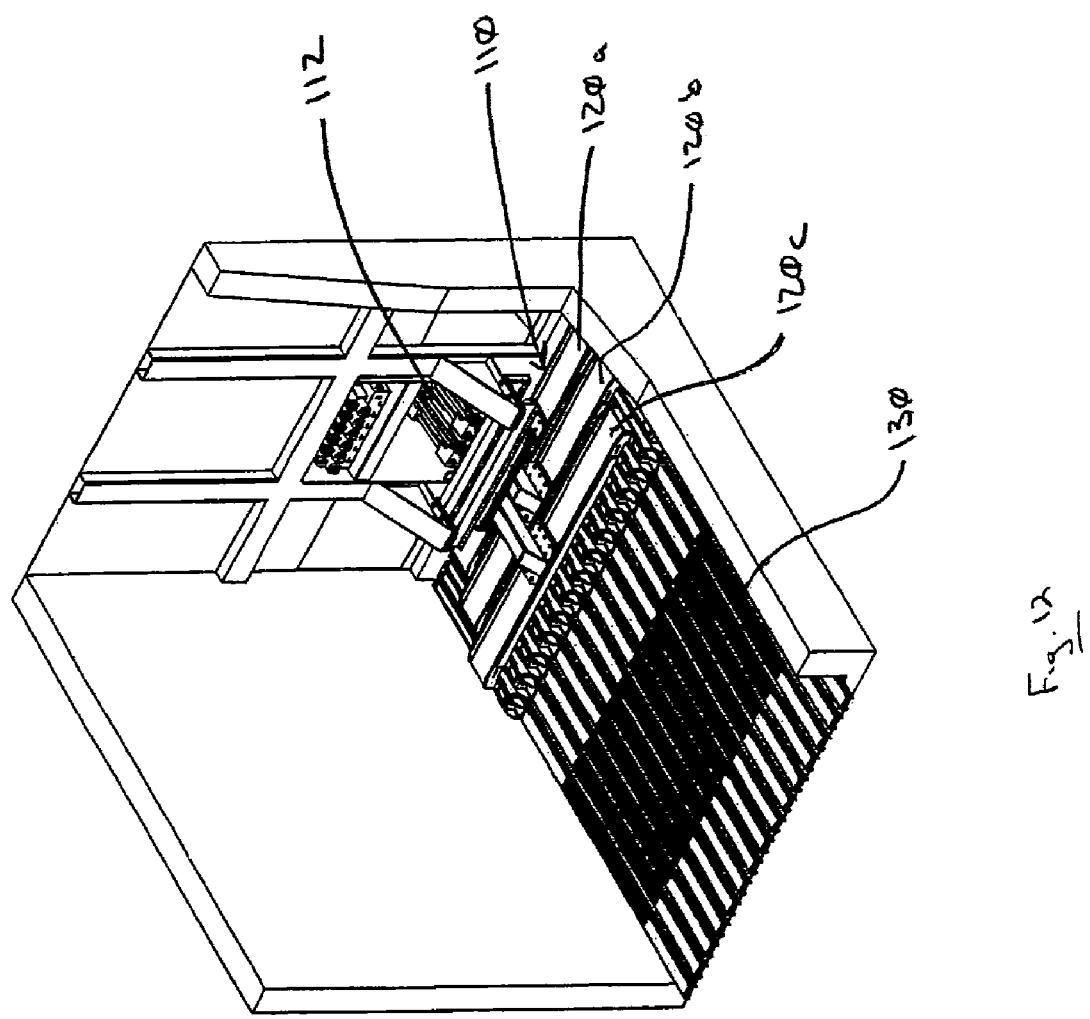
FIG. 12 is a perspective view of another conveyor assembly of the invention in a conventional trailer.
Figure 13:
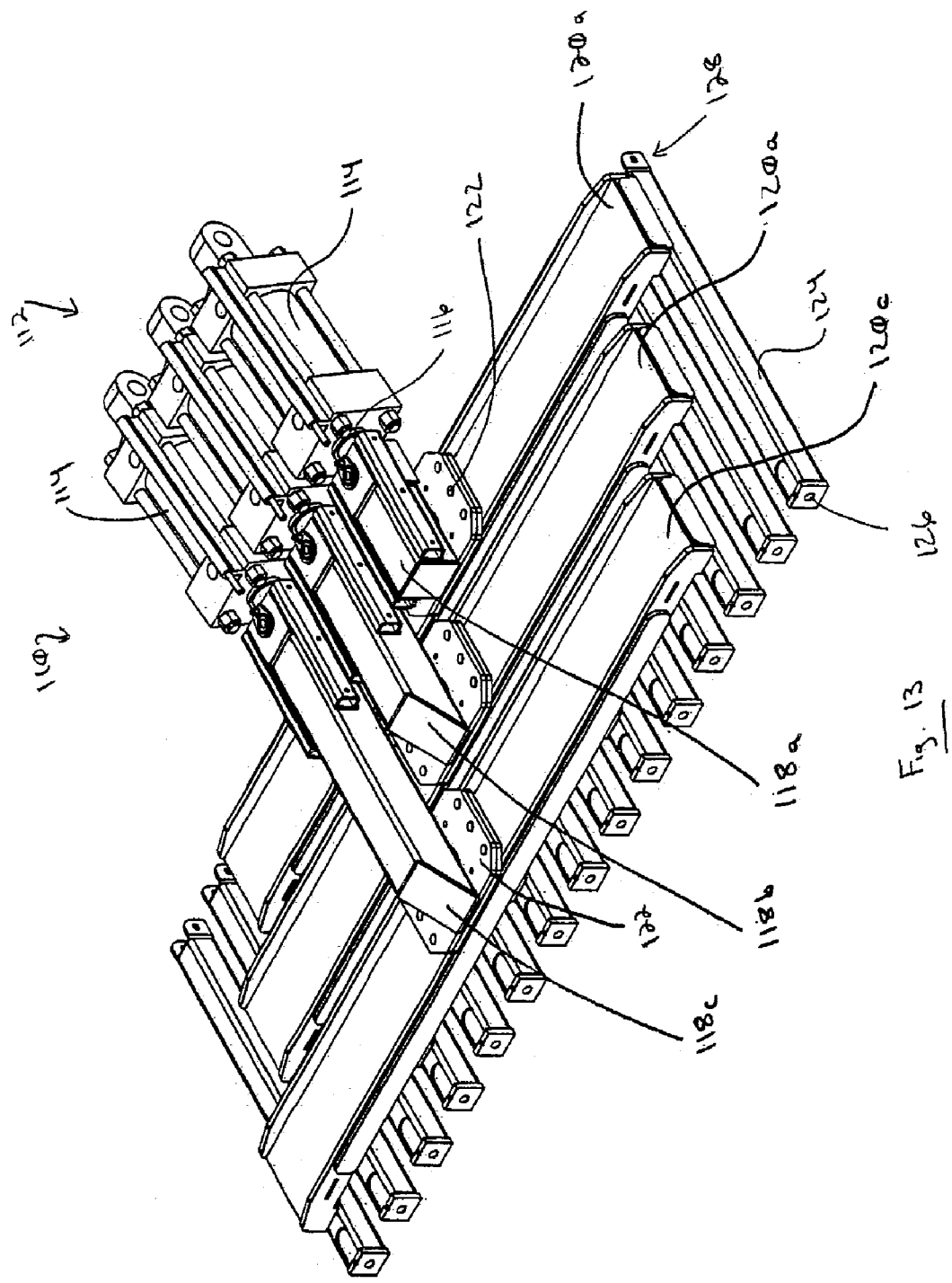
FIG. 13 is a perspective view of the cross beam assembly of the conveyor assembly of FIG. 12.

FIG. 12 shows another conveyor incorporating features of the invention. The conveyor is shown positioned in the front of a conventional trailer. As shown in FIGS. 12 and 13, the conveyor includes a cross beam assembly 110 connected to a drive assembly 112. The drive assembly 112 can be the same as the drive assembly 30 described above with respect to the previously described conveyor. Each cylinder 114 of the drive assembly 112 has a piston 116 connected to a rod extension 118 of the cross beam assembly 110. The connection between the piston rod 116 and rod extension 118 is a non-alignment critical connection, such as a swivel joint or similar connection to allow angular movement between the end of the piston rod 116 and the rod extension 118. Each rod extension 118 is connected to one cross beam 120. In the illustrated embodiment, each rod extension 118 is connected at or near its rear end to a selected cross beam 120 by a mounting plate 122. The rod extension 118 is connected to the top of the mounting plate 122 and the mounting plate 122 is connected to the cross beam 120 in any conventional manner, for example, by welding, bolts, screws, or any conventional connector. Connecting elements 124 are attached to the bottom of the cross beams 120, as described above. The connecting elements 124 are in the form of rectangular metal pieces having a rear end with an attachment element 126, such as a bore or similar attachment element therein. This is similar to the connecting elements 40 described above. However, in this embodiment, the connecting elements 124 also include a front connector 128. In the illustrated embodiment, the front connectors 128 are shown as tabs or extensions having aligned holes that can receive a connecting element, such as a pin or screw or the like.

Figure 14:
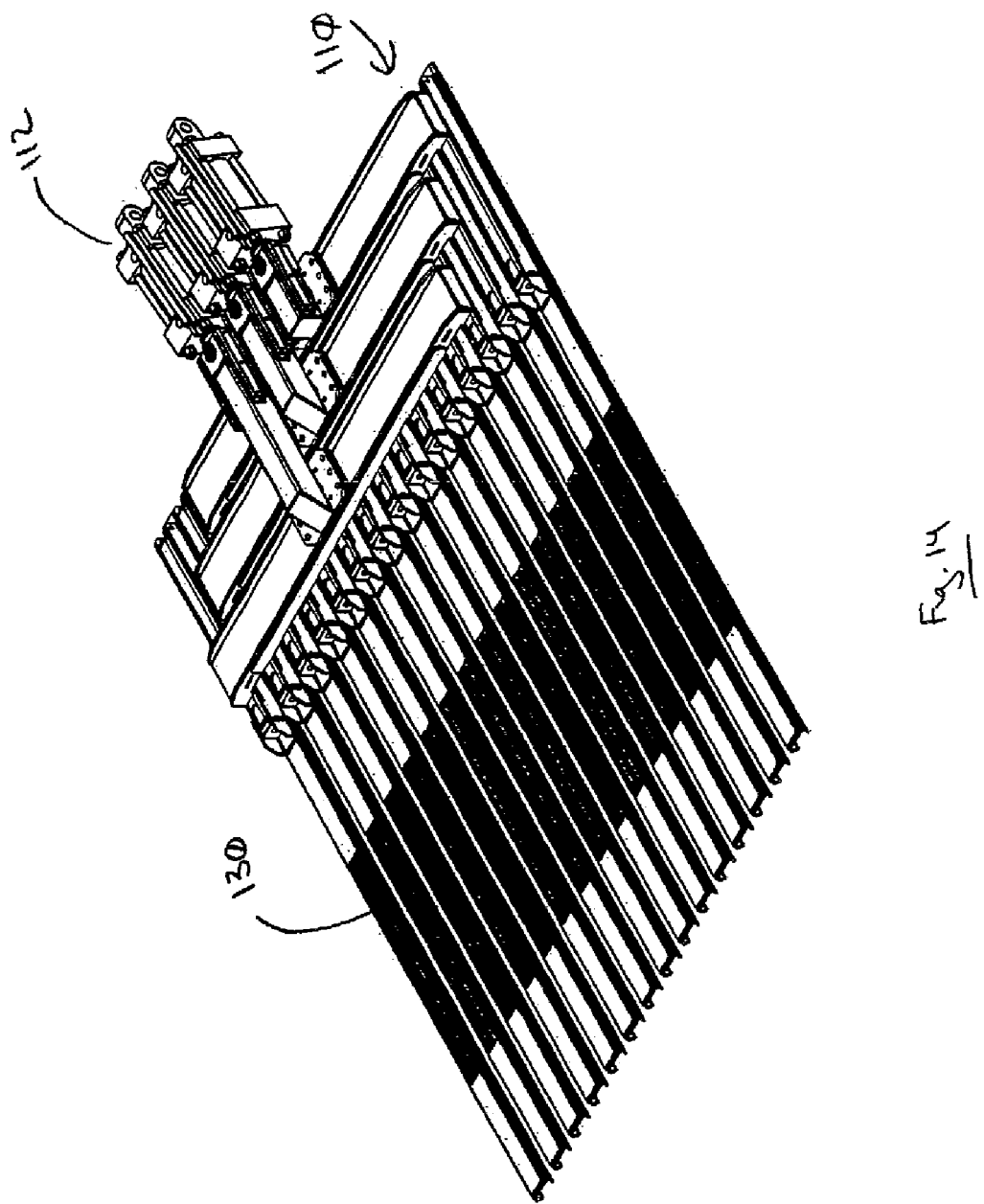
FIG. 14 is a perspective view of the cross beam assembly of FIG. 13 attached to slats.

FIG. 14 shows the cross beam assembly 110 connected to slats 130. As will be appreciated from FIGS. 14 and 15, the slats 130 include a receiving element 132 similar to the receiving element 42 described above having a vertical piece 134 with a hole that aligns with the bore in the rear end of the connecting element 124. However, unlike the previously described receiving element 42, the receiving element 132 of this embodiment also includes a forward connecting device 136 so that both the rear end and the front end of the connecting element 124 are attached to the slat 130. In the illustrated embodiment, the front connecting device 136 is in the form of a pair of holes on the upstanding wall of the receiving element. When the connecting element 124 is inserted into the slot of the receiving element 132, the rear end of the connecting element 124 abuts the vertical plate 134 and can be connected as described above. The holes of the front connector 128 align with the holes in the front connecting device 136 of the receiving element 132 such that the front end of the connecting element 124 can be secured to the front end of the receiving element 132 by a screw, bolt, pin, or other means and the front end of the connecting element 124 can be secured to the front end of the slat 130 by a pin or similar device passing through the aligned holes in the receiving element 132 and the connecting element 124.

FIG. 16 is an end view of the conveyor assembly of FIG. 12. In this embodiment, the leak-free pan 23 is positioned in the trailer 10 and longitudinal support beams 140 are attached to the pan or the bottom of the trailer. Longitudinal bearing sleeves 142, such as those described above, are connected to the support beams 140. The slats 130 are engaged with the bearing sleeves 142 and are moveable fore and aft on the bearing sleeves 142 by extension and retraction of the piston rods 116 of the drive assembly 112. As will be appreciated from FIG. 16, space is provided between adjacent slats 130 such that any accumulated debris can be swept, blown, or otherwise removed from the trailer 10 when the trailer 10 is desired to be cleaned.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

The invention claimed is:
1. A reciprocating slat conveyor, comprising:
a plurality of slats arranged in a plurality of slat sets, with each slat having a receiving element formed on top of the slat;

a cross beam assembly connected to the slats, wherein the cross beam assembly includes a plurality of rod extensions, with one cross beam connected to each rod extension, wherein each cross beam includes a plurality of connecting elements configured to engage the receiving elements on the slats;

a frame configured to engage the cross beam assembly, the frame defining a plurality of bearing guides configured to guide the rod extensions for lateral movement; and a drive assembly comprising a plurality of cylinders, with each piston rod connected to a rod extension by a non-alignment critical connector.

2. The assembly of claim 1, wherein the receiving elements include brackets attached to the top of the slats.

3. The assembly of claim 1, wherein the connecting elements are substantially rectangular metal pieces connected to the bottom of the cross beams.

4. The assembly of claim 1, wherein the bearing guides include plastic bearing elements.

5. The assembly of claim 1, wherein the connecting elements of the cross beams are connected to the receiving elements of the slats at a single connection point.

6. The assembly of claim 1, wherein the connecting elements of the cross beams are connected to the receiving elements of the slats at a plurality of single connection points.

7. The assembly of claim 1, wherein the drive assembly includes a plurality of cylinders, with the piston rod of each cylinder connected to a single cross beam by a non-alignment critical connector.

8. The assembly of claim 1, wherein the front of each cylinder is connected to the trailer by a non-alignment critical connector.

9. The assembly of claim 1, wherein the rod extensions are substantially rectangular hollow metal tubes.

10. The assembly of claim 1, wherein each connecting element includes an attachment element located at a rear of the connecting element.

11. The assembly of claim 1, wherein each connecting element includes an attachment element located at the rear and another attachment element located at the front of the connecting element.

12. The assembly of claim 1, wherein the top of the guides includes a horizontal guide device located above a top surface of the rod extension.

13. The assembly of claim 1, wherein the cross beam assembly includes a plurality of stabilization members connected to the cross beams and configured to engage guide members on the cross beam assembly during movement of the cross beams.

14. The assembly of claim 1, wherein the receiving elements include a vertical piece configured to be attached to the rear of the connecting element.

15. The assembly of claim 14, wherein the vertical piece includes a hole that aligns with a bore in the connecting element.

16. The assembly of claim 1, wherein the front of each cylinder is positioned higher than the rear of the cylinder.

17. The assembly of claim 1, wherein the frame engages flanges on the guides to prevent vertical movement of the rod extension.

18. The assembly of claim 1, wherein a friction pad is located between the bottom of the frame and the top of the cross beam assembly.

19. The assembly of claim 1, wherein each rod extension is connected to a cross beam by a mounting plate.

20. The assembly of claim 1, wherein the drive assembly includes an electronic position sensor associated with each cylinder, with the position sensors connected to an electronic control device.

* * * * *